(12) United States Patent
Rubin

(10) Patent No.: US 8,862,621 B1
(45) Date of Patent: Oct. 14, 2014

(54) INTELLIGENT UNIVERSAL SITUATION AWARENESS AND NATURAL LANGUAGE INTERFACE

(75) Inventor: Stuart H Rubin, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 1414 days.

(21) Appl. No.: 12/323,919

(22) Filed: Nov. 26, 2008

(51) Int. Cl.
*G06F 17/30* (2006.01)

(52) U.S. Cl.
CPC .................. *G06F 17/30539* (2013.01)
USPC .......................................................... 707/776

(58) Field of Classification Search
USPC .................... 707/702, 999.103, 999.104, 776
See application file for complete search history.

(56) References Cited

U.S. PATENT DOCUMENTS

2006/0085750 A1* 4/2006 Easton et al. .................. 715/708
2007/0214164 A1 9/2007 MacLennan et al.

* cited by examiner

*Primary Examiner* — Robert Beausoliel, Jr.
*Assistant Examiner* — Nirav K Khakhar
(74) *Attorney, Agent, or Firm* — SPAWAR Sytems Center Pacific; Kyle Eppele; Stephen E. Baldwin

(57) ABSTRACT

A relational database is used to determine a possibility of events, such as terrorist threats. A database is populated or updated in an automated fashion by using appropriate sensor sources. Whenever a field is augmented or updated, an event is defined. Events trigger intelligent data collection agents using a push technology. A list of events is defined over a relative time interval. A selection of lists of events is made in response to events. The defined database is updated according to an iterative architecture for the defined database.

6 Claims, 1 Drawing Sheet

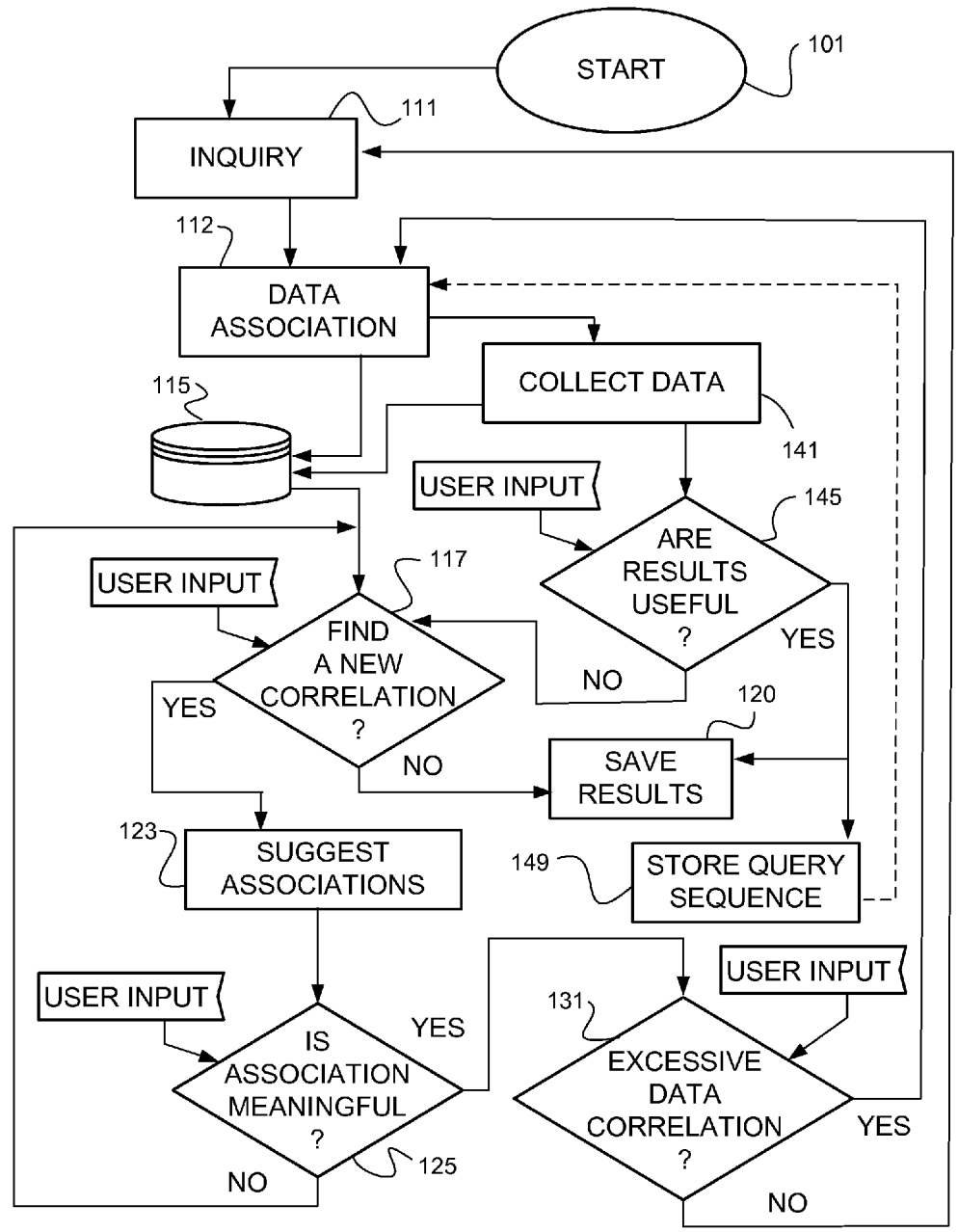

INTELLIGENT UNIVERSAL SITUATION AWARENESS AND NATURAL LANGUAGE INTERFACE

FEDERALLY-SPONSORED RESEARCH AND DEVELOPMENT

This invention (Navy Case No. 084410) is assigned to the United States Government and is available for licensing for commercial purposes. Licensing and technical inquiries may be directed to the Office of Research and Technical Applications, Space and Naval Warfare Systems Center, Pacific, Code 2112, San Diego, Calif., 92152; voice 619-553-2778; email T2@spawar.navy.mil.

BACKGROUND

1. Field

This disclosure relates to information discovery and to structuring of information discovery functions during execution of the information discovery process.

2. Background

Conventional analysis of threats includes manually combing through vast databases and unstructured text/reports. It would be desirable to effect rote portions of the analysis in an automated fashion.

An alternative method would be to use a database computer language such as structured query language (SQL) to do directed mining operations. This approach is not fully general, is difficult and costly to maintain, and does not provide a capability for linking database events.

Detection of event-related activity can require association of ostensively random events or events which appear to be random. An example of event-related activity for detection would be detection terrorist actions by their database signatures before they have a chance to do harm. Conventional analysis of threats includes manually combing through vast databases and unstructured text/reports. For purposes of data analysis, the meaning of terrorism may be broadly defined as the wanton harm or destruction or threat of harm or destruction to people, property, ideology, or civilization. This may or may not have a direct correspondence to a political or social definition of terrorism, but rather relates to terrorist activities and to terrorism-related activities. Thus for purposes of data collection, terrorism-related activities may include activities against a military target during an armed conflict.

SUMMARY

Activity discovery is performed by establishing a relational database, and sequentially including additional criteria for the database. The relational database is established and the database is populated or updated using at least one predetermined sensor source. The populating or updating establishes a defined event. A response is made to the defined event by setting at least one criterion for collection of further data. User input is obtained for acceptance of the criterion. A list of events is established and an association is made of the events with data associations obtained by the collection of the further data. The collection of the further data is used to generate a further search relevant to the lists of events. The sequence is iterated to provide useful results.

BRIEF DESCRIPTION OF THE DRAWING

FIG. 1 is a flow diagram showing the operation of the present subject matter.

DETAILED DESCRIPTION

Overview

The present system addresses a need of the operation and tactical community to gather accurate data. An example purpose of the subject matter is to detect terrorist actions by their database signatures before they have a chance to do harm.

Conventional analysis of threats includes manually combing through vast databases and unstructured text/reports. The current system provides an ability to learn to do what the analysts do through the development of a computational intelligence; namely, computing with words.

The present system makes use of knowledge bases, intelligent agents, blackboard architectures, orthogonal and visual programming languages, natural language, and expert compilers to build a directed mining and linking system that learns to automate much of the functionality that previously and painstakingly was necessarily done manually. The system:

1) learns by doing;
2) provides for an extensible very high-level user interface;
3) allows for the cumulative representation and capture of analyst expertise;
4) integrates proven technologies in novel ways to create a scalable, cost-effective, scientific approach to counter terrorism and terrorism-related activities; and
5) augments the learning process by presenting the user or operator with intermediate hypotheses.

Such discovery can be used to locate activity related to ostensively random acts, a practical example being terrorism and terrorism-related activities. Terrorism and terrorism-related activities may be broadly defined as the wanton harm or destruction or threat of harm or destruction to people, property, ideology, or civilization. More specifically, the technique addresses the actual or perceived threat to naval assets ashore, afloat, on land, or in the skies within the context of preserving American constitutional rights (e.g., individual rights pertaining to protection from unreasonable search and seizure).

Approach to Data Mining

Define the Asset of Interest: An asset is any tangible or intangible object having perceived value to the sphere of interest of the entity served. Thus, an asset could be a tangible or an intangible. By way of non-limiting example, for naval forces, naval assets could be defined as the sphere of interest. A naval asset would then be any tangible or intangible having perceived value to the Navy. Thus, taking the example of the Navy, an asset could be a tangible, such as a ship; or, an intangible, such as an encrypted message.

Given: A sensor source(s) streaming real-time data pertaining to one or more assets. In the example, this would be streaming real-time data pertaining to one or more naval assets.

Given: Numerous relational database repositories, the size of any pair of which may be assumed to be too large for a joint operation. Note that databases may be joined such that this last condition holds.

Given: Rapidly configurable lightweight agents capable of navigating all relational databases server-side and returning information to the user.

The methodology is as follows.

1. Populate/Augment/Update the appropriate relational database using the appropriate sensor source(s). This process is completely automated.
2. Whenever a field in the database is populated, augmented or updated, an event is defined. By way of example, if someone was to buy ammonium nitrate—a common fertilizer or explosive ingredient—then an event would be defined. Events trigger intelligent data collection agents using a push technology to expand or narrow search criteria.

3. A list of events is defined over a relative time interval. Lists of events can be retrieved using intelligent agents if the databases are time stamped.
4. Selection of relevant components of events which are event driven.
5. Providing an iterative architecture for the defined database.

Applying this methodology, a list of events can be considered. For example, the events may be relevant to collection of materials for a homemade bomb; however the methodology is not looking for events relevant to manufacture or use of homemade bombs per se, but rather for any events possibly relevant to terrorist activity. The particular activity of interest (bomb making involving a prill explosive) is a non-limiting example given for purpose of the understanding the end result of the data discovery. Consider the following events:

1.—purchase of ammonium nitrate
2.—purchase of fuel oil

The degenerate case is (purchase of NH4NO3+purchase of fuel oil). In this case, the event is not defined until both the oxidizer and the reducer are purchased. In one sense, this can be used for homemade explosive; however this information alone is likely to discover a large quantity of legitimate users. By way of example, the information would be useful for identifying people engaged in agriculture.

In terms of the database, a first database is populated based on purchases of NH4NO3. This could be further subdivided between various forms of NH4NO3, but is still only one or more databases of NH4NO3. The result provides no more information than a database of people engaged in farming who also fertilize their fields and use fuel oil for their power equipment. This database can be quite expansive, since someone intent on destruction may not be looking for the least costly source of fuel oil, and so the database of fuel oil purchases should probably also include purchase of taxable diesel fuel. In the case of taxable fuel, a purchase of 1000 liters (265 US gallons) would not be unusual.

Consider also that individuals who purchase significant quantities of NH4NO3 for legitimate purposes (fertilizer) are likely the same individuals who purchase correspondingly quantities of fuel oil. Fuel oil is used to power farm equipment. If investigated sufficiently, one would possibly discover some individuals fueling their highway vehicles with red diesel (i.e., fuel oil), which is illegal, but hardly a sign of terrorist activity. One could narrow this number to people purchasing stoichiometric quantities of fuel oil corresponding to the amounts of NH4NO3; however two factors limit the use of such data: 1) people making such explosives may not be particularly interested in maintaining stoichiometric mixtures; and 2) people engaged in such activities may have other uses for the material, which would alter the stoichiometric balance of materials purchased. Therefore, the data obtained from the first two items (NH4NO3 and fuel oil) may be of interest, but does not by itself provide useful information.

An expansion of the above database may include:
1.—purchase of ammonium nitrate
2.—purchase of fuel oil—degenerate case
3.—purchase of shoes
4.—purchase of blasting caps
5.—purchase of fuses
6.—purchase of fuzes Again, (purchase of NH4NO3+purchase of fuel oil) is the degenerate case of items 1 and 2. The additional data is intended to resolve the database to something more useful than people involved in those two purchases. Specifically the database and the amount of data required to correlate the database becomes complex without providing tangible results.

Use of shoes was at one point associated with terrorists; however this information would prove useless in resolving the data. Most terrorists wear shoes and probably purchase shoes, so a correlation can be made that hinders the discovery process. Using human reasoning, purchase of shoes would provide no useful information. Purchase of blasting caps does significantly narrow the scope of the search, because only a small percentage of farmers would have use for blasting caps.

To simplify the criteria for understanding consider items 5 and 6:
5.—purchase of fuses
6.—purchase of fuzes The items are similar, have similar mechanical structure; however a fuse is a protective device and a fuze is an igniter. Purchase of fuses would subdivide farmers into those who maintain their own equipment and those who do not, but would have no relevance to narrowing the scope of the database. Using human intervention, one would include purchase of fuzes because purchase of fuzes could indicate a terrorist activity. In some cases, "fuse" is used to designate an igniter, so it may be necessary to determine if both items ("fuses" and "fuzes") are necessary to incorporate data relevant to fuzes. It may be that this issue is already addressed in the source database, but it is also possible that the ambiguity exists. In either case, human intervention may be beneficial to determine a desired implementation of data collection.

Data Collection and Correlation

FIG. 1 is a flow diagram showing the operation of the program. After start (step 101), an initial inquiry is made (step 111), which may be either generated by a user, as a response to a detected event, or as a response to a data input directed to a basic search query. The inquiry is reduced to a data association (step 112), which is stored as a first data element of a relational database 115. The relational database 115 will be populated or updated according to the data association. The populating or updating the database can be achieved using one or more sensor sources, such as by way of non-limiting example, data collection, data lookup, physical sensing, or data input, the populating or updating establishing a defined event.

Responsive to storing of the relational database 115, a determination (step 117) is made as to whether to find a new correlation. Determination 117 is made with the help of human input or direction, in which the operator determines a need to expand the search criteria in order to narrow the search. This type of user input can be as simple as a user of a search engine proceeding to a next page of search results. Other considerations are whether there are results or whether existing results include a specific ambiguity. In the event of a negative determination (at 117), the results are saved (step 120). In the event of a positive determination (at 117) to find a new correlation, suggestion of associations (step 123) is made, and a determination (step 125) is made as to whether the association is meaningful. User input is applied to determination 125, for the reasons stated above.

The user input applied to determination 125 is used to express the expansion of the database 115 in a meaningful way. While many facts can be associated with an initial inquiry (step 111), only some of the facts will make sense in the real world even in cases where other facts make sense from a logical standpoint. Moreover, since each expansion of the database 115 adds complexity to the database and has the potential of adding substantial complexity to the database 115, it is beneficial to apply a "sanity test" (human review of the logic) to the new association. Thus determination 125 may be used to evaluate the value of the suggested association (step 123). In the event the determination 125 indicates the association is not meaningful, the process again reverts to a determination (step 117) of whether to find a new correlation. In the event the determination 125 indicates the association is meaningful, a determination 131 is made as to whether the association would result in excessive data correlation. Since some data correlations can take inordinate amounts of processing power, time or memory to resolve, determination 131 is useful to intercede to avoid inefficient use of data resources. Determination 131 also accepts user input, since there are instances in which the correlation is promising enough that the use of large amounts of data resources can be justified.

In the event of determination 131 being negative, data correlation is deemed non-excessive, and the inquiry 111 is invoked. In the event of determination 131 being positive, the data association process (step 112) is invoked to seek a new association. The data association process (step 112) also invokes a data collection process (step 141). The collected data is added to database 115 along with the data association, and a determination (step 145) is made as to whether the collection of data is useful. The determination (step 145) would incorporate user input to the extent that the usefulness of the data would be apparent to a user more so than to a computer.

In response to the determination (step 145) of whether the results are useful, a negative result invokes the determination of whether to find a new correlation (step 117). A positive determination (step 145) results in saving the results (step 120) and storing a query sequence (step 149). The storing of the query sequence (step 149) enables a repetition of the sequence expeditiously, and with less user inputs.

It should be noted that several of the steps can be combined. The steps can be performed in combination and in variations in the order described. As indicated previously, the user inputs for the determinations (steps 117, 125, 131, 145) can be combined to an extent that this may be convenient. For example, the user input for determination 117 (new correlation) can be combined with user input associated with determinations 125 (association meaningful) and 141 (excessive data correlation).

Applicability of Data Correlations

In the above non-limiting example, the identification of such persons does not imply nefarious activity or guilt, but it is possible to investigate the activity. The knowledge itself does not provide more than an indication of where to look; however, this is significantly easier than merely identifying potential threats without the data.

If and when the confluence of events occurs, then all updates during this interval are captured in the form of a list for further processing.

Looking again at the above events, it is possible to generate a correlation between fuel oil (untaxed) delivered to a retail customer, fuel oil (taxed) delivered to a retail customer, fuel oil (untaxed) purchased at a service station and fuel oil (taxed) purchased at a service station. There are also large drops of inventory in excess of 10,000 liters which would be associated with wholesale purchases or large scale users. In general, the information may not be meaningful; however there may be a threshold amount that indicates unusual use, such as purchase of fuel oil (taxed or untaxed) in excess of 1000 liters (265 US gallons). A human analyzing the data would make a determination as to whether to further explore this information. If it appears that the information may be beneficial for analysis, the human can either modify the criteria for collecting the information or accept a suggested criteria. This allows parsing of information which would otherwise be meaningless, such as all sales of fuel oil in excess of a specified amount. If this is segregated between aggregate sales for retail delivery in excess of 2000 liters, all service station sales in excess of 1000 liters, but excluding sales in excess of 10,000 liters, then this would separate unusual activity, but not activity typically associated with various common activities.

Events can be object-oriented. This facilitates the human in the specification of events without the burden of excessive detail. The human input is effective in avoiding a combinatoric explosion. This is achieved if the event specification can be modified by feedback from the database system to the user. By way of example, with reference to the previous example, a hierarchical specification would be (purchase of oxidizer; purchase of reducer). This would cover the purchase of say LOX (liquid oxygen) and hydrazine (i.e., a potentially explosive rocket fuel), but it would also cover the purchase of medical home use or welding oxygen and rubbing alcohol (i.e., which is highly unlikely to find its way into an explosive device). This example clearly points up the need for an object-oriented event-driven programming language and we will have more to say on this topic below.

The previous step showed that lists of events are event driven. This means that the retrieval of one list of events can trigger the search for another list of events and so on in a complex search pattern. Just as is the case with a rule base, there is a potential O(n!) explosion in the order of fired predefined search patterns. This is conceptually a type of hierarchical data mining. In other words, there is a high degree of non-determinism in the search for evidence. Also, the events themselves can be object-oriented for greater efficiency, which is of course paramount when dealing with terabytes of data. An example of this would be the previously returned event list (purchase of NH4NO3; purchase of fuel oil; purchase of blasting caps; purchase of fuse; purchase of fuze; purchase of shoes). This detection of event can trigger the generation of another list, namely: (purchase of blasting caps; purchase of fuse; . . . ). The human intervention is used to intercede with both a logical relevance to the data (e.g., fuse vs. fuze) and a determination of potential relevance (e.g., all purchasers of fuel oil, or purchasers of fuel oil excess of 1000 liters but not in excess of 10,000 liters).

The defined database architecture is iterative with the following advantages:

- The number of databases and their content is open. Thus, new databases can be easily added to the system.
- A hierarchical database architecture allows for the efficient search and retrieval of desired information. Notice that the complexity of search grows logarithmically with the scale of the proposed architecture.
- While the relational format implies structure, unstructured information (e.g., text) can be locally preprocessed for inclusion in the relational format.
- Intelligent agents can reconfigure the sensors for context-based observation.
- The size of the system is limited only by the available hardware.
- Unlike the case for systems based on data mining, the user can control what is to be sought using an object-oriented event-driven programming language. The object-oriented nature of this language permits rapid search and constrained discovery.
- The system is subject to continual refinement through programming and programmed modules can be developed accordingly. By way of example, one module can be developed for Threatcon Alpha, another for Threatcon Beta, and so on.

An Object-Oriented Event-Driven Programming Language

The object-oriented event-driven programming language may have the following list of properties:

It is extensible.

It is object-oriented in the sense made clear in the previous section.

It has conditional definitions and of course conditional execution constructs.

It is able to synthesize lightweight agents and synchronize their returns.

It works with time stamps.

It is executable on various platforms—suggesting a Java implementation.

It works with absolute as well as relative object definitions.

The programming language should provide "Hot Buttons" to bring up pull-down menus together with on-line Help. This will enable users to see what databases, their fields, and their attributes are available for use at any given point in the program.

Functional View

The object-oriented event-driven procedure provides a functional hierarchical data assembly approach. An example of such an approach is presented by the following example, directed to the concept of a "truck bomb":

```
DEFINE Truck-Bomb-Detector (X);
    // Value parameter X is set by threat level:
    // alpha use 0.75; beta use 0.50; delta use 0.25
    // where delta is the highest threat here.
    DEFINE EXTERNAL MODULES:
        High-Explosive-Manufacture;
    DEFINE ATTRIBUTE: Rental:
        {'Avis' 'Budget' 'Hertz'};
    DEFINE FIELD: Unauthorized Vehicle:
        Transportation DB. Facility Pass = 'No' OR
        Facility Pass = 'Exp' OR
        Vehicle DB. Type is Rental AND
        (Class= 'Van' OR 'Truck');
    DEFINE FIELD: Foreign Contractor Enters:
        Contractor DB. Log DB. Time-In > 0 AND
        Origin = 'Foreign';
    DEFINE FIELD: Foreign Contractor Leaves:
        Contractor DB. Log DB. Time-Out > 0 AND
        Origin = 'Foreign';
    START AGENT:
    IF p(High-Explosive-Manufacture) >= X THEN
    BEGIN
        WHILE Foreign Contractor Enters AND
        NOT Foreign Contractor Leaves DO
            IF Unauthorized Vehicle THEN
                SIGNAL ALERT (Y)
                // Returns a probability, p for Y
    END;
END.
```

CONCLUSION

It will be understood that many additional changes in the details, materials, steps and arrangement of parts, which have been herein described and illustrated to explain the nature of the invention, may be made by those skilled in the art within the principle and scope of the invention as expressed in the appended claims.

What is claimed is:

1. A method of activity discovery comprising;
   establishing a relational database;
   populating, augmenting or updating the database using a free form natural language, the populating, augmenting or updating establishing a defined event;
   responding to the defined event by setting at least one criterion for collection of further data;
   obtaining a user input for acceptance of the criterion;
   establishing a list of events, and associating the events with data associations obtained by the collection of the further data;
   using the collection of the further data to generate a further search relevant to the lists of events; and
   iterating the sequence by further populating, augmenting or updating the database using agent-based architectures and their respective knowledge bases, programming languages, and generated expert compilers to build a directed mining and linking system.

2. The method of claim 1 wherein the iteration comprises:
   using an open number and content of databases, thereby facilitating adding new databases;
   using a hierarchical database architecture to allow for the efficient search and retrieval of desired information;
   using unstructured information, and locally preprocessing the information for inclusion in a relational format of the database;
   using intelligent agents to reconfigure the sensors for context-based observation; and
   using an object-oriented event-driven programming language to provide user control for selection of search items.

3. The method of claim 1 wherein the iteration comprises modifying the collection of data in accordance with level of collection interest.

4. A computer program product, comprising:
   a non-transitory computer-readable medium further comprising:
   a first instruction for causing a computer to establish a relational database;
   a second instruction for causing the computer to populate, augment or update the database using a free form natural language, the populating, augmenting or updating establishing a defined event;
   a third instruction for causing the computer to respond to the defined event by setting at least one criterion for collection of further data;
   a fourth instruction for causing the computer to obtaining a user input for acceptance of the criterion;
   a fifth instruction for causing the computer to establish a list of events, and associating the events with data associations obtained by the collection of the further data;
   a sixth instruction for causing the computer to use the collection of the further data to generate a further search relevant to the lists of events; and
   a seventh instruction for causing the computer to iterate the sequence by further populating, augmenting or updating the database using agent-based architectures and their respective knowledge bases, programming languages, and generated expert compilers to build a directed mining and linking system.

5. The computer program product of claim 4 wherein instruction to iterate the sequence comprises:
   an instruction for using an open number and content of databases, thereby facilitating adding new databases;
   an instruction for using a hierarchical database architecture to allow for the efficient search and retrieval of desired information;

an instruction for using unstructured information, and locally preprocessing the information for inclusion in a relational format of the database;

an instruction to use intelligent agents capable of reconfiguring the sensors for context-based observation; and an instruction for using an object-oriented event-driven programming language to provide user control for selection of search items.

6. The computer program product of claim 4 wherein the instruction to iterate the sequence comprises modifying the collection of data in accordance with level of collection interest.

* * * * *